Figure 1:
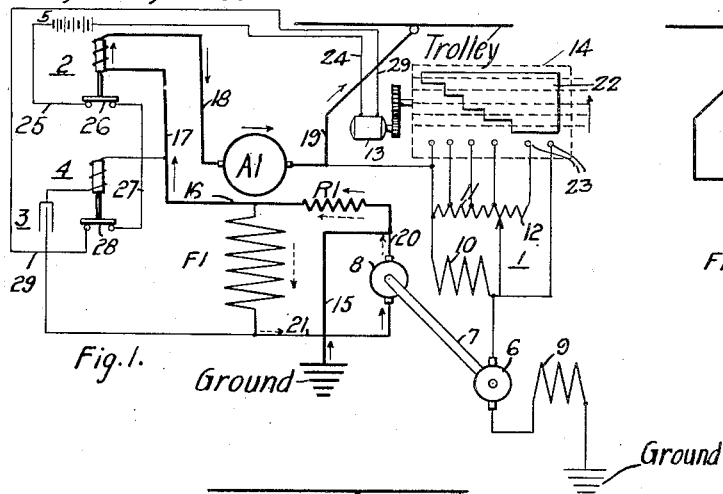

R. E. HELLMUND.
SYSTEM OF CONTROL.
APPLICATION FILED AUG. 11, 1917.

1,361,992.

Patented Dec. 14, 1920.

WITNESSES:
J. T. Wurmb
W. R. Coley

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,361,992.   Specification of Letters Patent.   Patented Dec. 14, 1920.

Application filed August 11, 1917. Serial No. 185,698.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control, of which the following is a specification.

My invention relates to systems of control and particularly to the automatic control of dynamo-electric machines that are employed in the operation of electric-railway vehicles and the like.

Heretofore, more or less difficulty has been experienced in many types of systems for controlling direct-current railway motors by reason of the unreliable or uncertain regulating operation that has resulted as a consequence of the damping or inductive effect in the main field windings. Such an effect introduces a certain time element or lag between a variation of armature-circuit current, which may be caused by changes of circuit resistance or of supply-circuit voltage, and the automatic regulation of field-winding current to counteract such undesired variations. For example, in the well-known type of automatic control systems, wherein a current relay or limit switch is utilized to automatically govern auxiliary-circuit connections, in accordance with variations of main-armature current, the time element necessary to produce the desired increase of motor current when the limit switch has dropped to its lower position is sufficient to permit the limit switch to remain in its lower or circuit-closing position a length of time that permits two or three steps of field-circuit regulation in cases where only one step is necessary or desirable.

The object of my present invention is to provide a system of the above-indicated character, wherein the time element in question is counteracted or eliminated to permit the exact degree of automatic regulation that is desired.

More specifically stated, it is the object of my invention to connect a condenser or other device that is actuated by a charging current upon a relatively rapid rate of flux change in certain of the machine circuits to so influence the operation of the normally employed limit switch that the resultant combined effect of the limit switch and the condenser causes the exact degree of regulation that is desired in any particular instance.

My invention may best be understood by reference to the accompanying drawing, wherein Figure 1 to Fig. 5, inclusive, illustrate various modifications of control systems embodying the invention.

Referring to Fig. 1 of the drawing, the system shown comprises supply-circuit conductors Trolley and Ground; a main dynamo-electric machine having a commutator-type armature A1 and a field winding F1 of the series type; a stabilizing resistor R1 that is associated with the main-machine circuits in a manner to be set forth; a motor-generator set 1 that is driven from the supply circuit for the purpose of furnishing auxiliary excitation to the main field winding F1 under regenerative or other conditions; a current relay or limit switch 2 for normally effecting automatic control of any desired machine circuits; and a condenser 3, or other equivalent means, which is associated with a second relay device 4 that is adapted to automatically influence the control of the circuits just mentioned, under predetermined conditions.

The motor-generator set 1 is shown as comprising a driving or motor armature 6 which is mechanically associated through a shaft 7, for example, with an exciting or generator armature 8. The driving armature 6 is provided with a series-related field winding 9, while a field winding 10 for the exciting armature 8 is provided with a shunt resistor 11 which may be varied in active circuit value, as indicated by the arrowhead 12.

Inasmuch as the details of main or auxiliary circuit connections are, for the most part, immaterial to my present invention, I have not deemed it necessary to illustrate or describe the complete automatic control of the illustrated motor. Assuming, therefore, that the connections shown have been suitably effected to produce regenerative operation of the main machine, the main-armature circuit, indicated by solid arrows, is established from the supply-circuit conductor Ground through conductor 15, the stabilizing resistor R1, junction-point 16, conductor 17, actuating coil of the limit switch 2, conductor 18, main armature A1 and conductor 19 to the trolley.

The exciting or main-field-winding circuit, indicated by the dotted arrows, is established from the positive terminal of the generating armature 8 through conductor 20, the stabilizing resistor R1, main field winding F1 and conductor 21 to the negative terminal of the armature 8.

An auxiliary circuit is completed from the conductor 19 through the field winding 10 for the exciting armature, which field winding is initially shunted by a relatively small portion of the resistor 11 to provide the proper main-field-winding excitation under high-speed regenerative conditions, circuit being continued from the field winding 10 through the driving armature 6 and its field winding 9 to ground.

The limit switch 2 is thus energized in accordance with main-armature current, as is customary in automatic control systems and, in the illustrated lower or operative position of the limit switch, an auxiliary circuit is normally completed from an auxiliary source of energy, such as a battery 5, through conductor 25, coöperating contact members 26 of the limit switch, conductor 27 and coöperating contact members 28 of the second relay device 4 in its normal or lower position, conductor 29, the windings of a suitable pilot motor 13, and conductor 24 to the battery. The pilot motor actuates a controller 14 having a contact segment 22 that coöperates with a plurality of control fingers 23 to vary the resistor 11. In the present instance, the illustrated circuits may be employed to govern the operation of the movable controller 14, whereby the excitation of the auxiliary field winding 10 is gradually increased, by increasing the resistor 11, as the speed of the momentum-driven main armature decreases during the braking period, to provide a desirably constant rate of retardation.

The actuating coil of the relay device 4 is connected through the condenser 3 across the main field winding F1. Consequently, the relay device normally occupies its lower or circuit-closing position and is lifted to interrupt the connection between conductors 27 and 29 only when a charging current traverses the relay coil circuit, that is, during a relatively rapid rate of flux change in the main field winding. In this way, the relay device 4 influences the automatic control operation that is normally governed by the limit switch 2 whenever the excitation of the main field winding is undergoing certain changes, whereby the previously mentioned excessive circuit regulation is prevented.

More specifically stated, if it is assumed that the limit switch 2 has dropped to its illustrated lower position, thereby causing the movable controller 14 to operate through one step to effect an increase of the main-field-winding voltage, the above-mentioned charging current flowing through the condenser 3 will immediately cause the relay device 4 to lift and thus open-circuit the automatic-control conductors 25 and 29, irrespective of the fact that the limit switch 2 remains in its lower position for a relatively long interval by reason of the previously-mentioned inductive or damping effect of the main field winding. The arrangement and proportion of parts is such that the relay device 4 will remain in its upper circuit-opening position as long as the main-field-winding excitation is undergoing any material changes, that is, as long as the main-armature current is likely to vary and until the limit switch 2 has again been raised to its upper position after the main-armature current has increased the desired amount.

In certain cases, it may be desirable to make the action of the relay devices 2 and 4 dependent upon the combination of main-armature current variations and field-winding changes in such manner as to permit a relatively high rate of field-excitation change when the main-armature current is relatively low and a relatively low rate of variation of field excitation when main-armature currents are relatively heavy. Such a combination is very desirable, since, whenever the main-armature current is relatively great, it is necessary, in the interests of satisfactory machine internal conditions, to prevent further steps in the automatic control until the field excitation is fully established, whereas, under conditions of relatively small armature current, such prevention is not necessary to the same degree.

Figure 2:
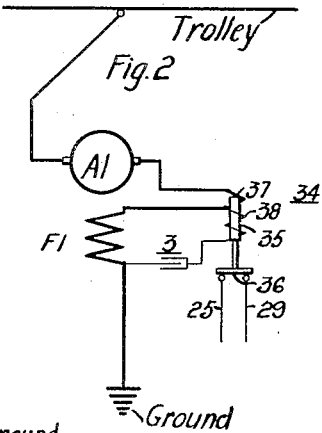

Fig. 2 illustrates a system for accomplishing the above-mentioned result by providing a combined relay device 34 which is energized in accordance with both the current traversing the main armature A1 and the rate of change of the voltage across the main field winding F1. The relay device 34 is shown as comprising a single magnetizable core 35 to which is attached the usual movable contact member or disk 36 which, in the present case, directly connects the conductors 25 and 29 in the lower position of the relay device. A continuous plural-section actuating coil is provided for the relay, having one portion 37 connected in series relation with the main armature A1 and having a second portion 38 connected through the condenser 3 across the main field winding F1.

The general operation of the relay device 34 will be understood from the similarity thereof to the previously described operation of the two relay devices 2 and 4 of Fig. 1. Briefly stated, the actuating coil 37 is alone effective in governing the auxiliary control circuit under normal conditions, but, upon a predetermined rate of flux change in the main field winding F1, the charging current traversing the condenser 3 serves to further influence the relay device and maintain it in its upper or open position until stable conditions have again been attained.

The system of Fig. 2 has the further advantage that the actuating coils 37 and 38 produce a cumulative effect only when the main-field-winding excitation is changing in one direction, that is, only during the period when the excitation is decreasing. For example, assuming that the main motor is being accelerated by means of a control system which embodies an automatic regulating controller having a relatively small time-element of action, the actuating coil 38 may be connected in such manner that its effect counteracts the coil 37 when the field voltage increases and supplements the action of the coil 37 when the field voltage decreases. If the regulating controller is actuated one step in the forward direction, the main-field-winding excitation instantaneously increases, but no further movement of the controller will occur because of its own relatively small time element. After such sudden increase, the field-winding voltage slowly decreases until suitable conditions are reëstablished. During this decrease, the condenser 3 discharges and the current in the actuating coil 38 acts cumulatively with respect to the actuating coil 37, whereby the relay device is maintained in its upper position until main-field-winding conditions are substantially constant, whereupon the current coil 37 alone controls the relay device.

Figure 3:
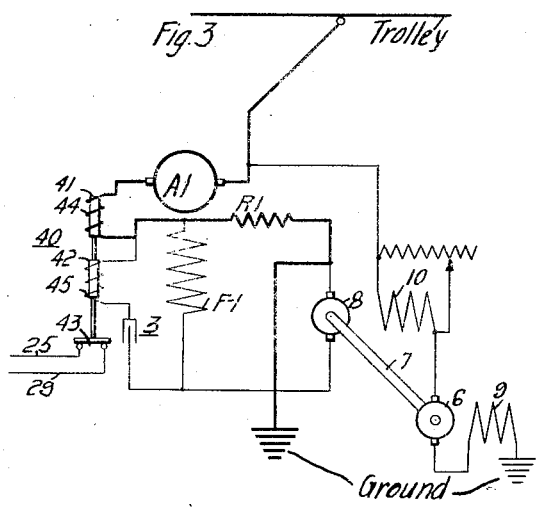

Whenever it is desirable to, at all times, add the effect of the charging current to that of the main armature current, irrespective of the direction of such charging current, the arrangement illustrated in Fig. 3 may be employed. The system shown may be identical with that illustrated in Fig. 1, with the exception of the substitution of a combined relay device 40 for the relay devices 2 and 4 of Fig. 1.

The relay device 40 comprises two independent magnetizable cores 41 and 42 which are mechanically secured to the movable contact member 43 and which are respectively provided with actuating coils 44 and 45 that are energized by the main-armature current and by the charging current of the condenser 3, respectively, the coil 45 and the condenser 3 being connected across the main field winding F1.

In the present instance, the above-mentioned sudden increase of field voltage upon movement of the regulating controller through one step will cause the relay device to quickly lift to its upper position through the action of the charging current traversing the actuating coil 45, and the main current coil 44 will then maintain the relay device in its upper position until the armature current has again diminished to the desired value.

Figure 4:
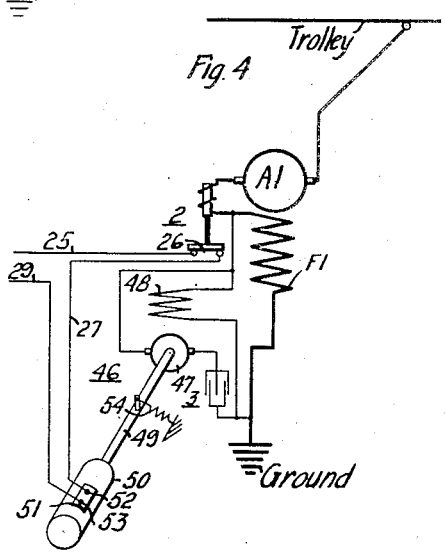

Fig. 4 illustrates a system that, in general, corresponds to the system of Fig. 1, a polarized relay device 46, however, being substituted for the solenoid-type relay 4 of Fig. 1.

The polarized relay 46 is shown as comprising a commutator-type armature 47, which is connected through the condenser 3 across the main field winding F1, and a field winding 48 which is directly energized from the main field winding. Upon the shaft 49 of the armature 47, a small cylinder or drum 50 is mounted and carries a contact segment 51 which normally bridges stationary contact members or control fingers 52 and 53. A suitable spring 54 is provided for normally biasing the drum 50 and the armature 47 to the illustrated contact-making position.

When the limit switch 2 and the polarized relay 46 occupy their illustrated positions, the governed auxiliary circuit is established from the conductor 25 through coöperating contact members 26 of the limit switch 2, conductor 27 and control fingers 52 and 53, which are bridged by the contact segment 51 of the drum 50, to the conductor 29.

Whenever the above-mentioned charging current flows through the condenser 3 and, consequently, through the armature 47 of the polarized relay 46, the relay device is actuated, in opposition to the spring 54, to a position wherein the contact segment 51 of the drum 50 is disengaged from the control fingers 52 and 53. The auxiliary governed circuit is thus maintained open, irrespective of the condition of the limit switch 2, until main-field-winding excitation conditions have again become stable, whereupon the armature 47 is returned by the spring 54 to the illustrated position, by which time the limit switch 2 has again moved to its upper or open-circuit position.

Figure 5:
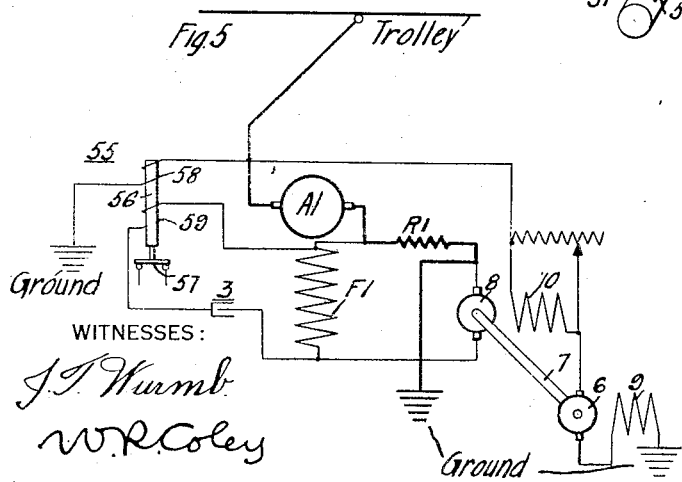

The principle set forth in connection with the previous figures may also be utilized to good advantage for the purpose of effecting relatively rapid action of over-voltage relay devices during regenerative control operation, for example. Fig. 5 illustrates such a system, wherein the circuit connections, with the exception of the substitution of an over-voltage relay device 55 for the limit switch 2 and the relay 4, are identical with those shown in Fig. 1.

The over-voltage relay 55 comprises a single magnetizable core 56 to which is attached a movable contact disk 57 for governing the actuating-coil circuit of a line switch, for example, in accordance with a familiar custom, and a plurality of independent actuating coils 58 and 59 which are respectively connected to the supply-circuit conductors Trolley and Ground and connected across the main field winding through the condenser 3.

In the event of a relatively high field-winding voltage, which may occur, for example, by reason of an interruption of supply-circuit voltage, if the coils 58 and 59 are connected to assist each other, the action of the over-voltage relay becomes much more positive and reliable than the action of previous over-voltage relays that depended upon the differential relation of the supply-circuit voltage and the main-machine voltage. Such positive action is produced by reason of the relatively rapid lifting of the core 56 upon the sudden change of main-field-winding-voltage, which sends a charging current through the condenser 3 and the actuating coil 59 of the relay.

Thus, if the over-voltage relay is constructed of the polarized type, that is, if the actuating coils 58 and 59 are related as shown in Fig. 5, the above-mentioned assisting action thereof becomes effective only in the case of a voltage rise in the main machine, and the actuating coil 59 counteracts the coil 58 when the machine voltage decreases.

It will be appreciated that the various illustrated relay devices may be employed for different purposes than those hereinbefore set forth, in any case the normal operation of the limit switch 2, or its equivalent, being further influenced to modify the automatic control operation in accordance with the rate of change of flux in the main field winding or other machine circuits. Furthermore, the condenser circuit may be connected in various other equivalent ways, such as through a series transformer in the field winding circuit, across the stabilizing resistor R1 or across the field winding 10 of the auxiliary generator armature 8.

Consequently, I do not wish to be restricted to the specific circuit connections or arrangement of parts herein set forth, but desire that only such limitations shall be imposed as are indicated in the appended claims.

I claim as my invention:

1. In a control system, the combination with a dynamo-electric machine and automatic means for influencing the operation thereof, of means actuated by a condenser charging current derived from a circuit of said machine for further influencing said operation under predetermined conditions.

2. In a control system, the combination with a dynamo-electric machine and automatic means for influencing the operation thereof, of a control circuit embodying condensive means for automatically influencing said operation under predetermined transient conditions in one circuit of said machine.

3. In a control system, the combination with a dynamo-electric machine and automatic means for influencing the operation thereof, of a relay device for automatically influencing said operation upon a relatively rapid rate of flux change in certain of the machine circuits.

4. In a control system, the combination with a dynamo-electric machine and automatic means for influencing the operation thereof, of means actuated by a condenser charging current for modifying the effect of said automatic means under predetermined electrical conditions in a circuit of said machine.

5. In a control system, the combination with a dynamo-electric machine and automatic means for governing certain control connections therefor, of an auxiliary circuit embodying condensive means for automatically modifying said connections under predetermined conditions in a circuit of said machine.

6. In a control system, the combination with a dynamo-electric machine and an automatic relay having contact members for governing certain control connections for said machine, of a coil for said relay for automatically modifying the machine operation upon a relatively rapid rate of flux change in certain of the machine circuits.

7. In a control system, the combination with a dynamo-electric machine having an armature and a field winding, and a limit switch having an actuating coil connected in series relation with said armature and having contact members for governing certain control connections for said machine, of a second coil for said switch and a condenser connected through said second coil across said field winding.

8. In a control system, the combination with a dynamo-electric machine having an armature and a field winding, of a condenser, and a relay device having contact members for governing certain control connections for said machine and having a plurality of actuating coils, one coil being connected in series relation with said armature and another coil being connected through said condenser across said field winding.

9. In a control system, the combination with a dynamo-electric machine having an armature and a field winding, of a condenser, and a relay device having contact members for governing certain control connections for said machine and also having magnetizable core members and a plurality of actuating coils for said cores, one coil being connected in series relation with said armature and another coil being connected through said condenser across said field winding.

10. In a control system, the combination with a dynamo-electric machine having an armature and a field winding, of a condenser, and a relay device having contact members for governing certain control connections for said machine and also having a movable core member having a plurality of independent magnetizable cores and an actuating coil for each core, one coil being connected in series relation with said armature and another coil being connected through said condenser across said field winding.

11. In a control system, the combination with a dynamo-electric machine having an armature and a field winding, of a relay device adapted to operate under the combined influence of machine load current and certain changes of field conditions for governing certain control connections for said machine.

12. In a control system, the combination with a dynamo-electric machine having an armature and field winding, of a relay device for governing certain control connections for said machine, said device being normally influenced by the machine load current and being intermittently influenced in accordance with the rate of change of field conditions.

13. In a control system, the combination with a dynamo-electric machine having an armature and a field winding, of a relay device for governing certain control connections for said machine, said device being normally influenced by the machine current and being intermittently influenced in accordance with the rate of change of the machine voltage.

14. In a control system, the combination with a dynamo-electric machine having an armature and a field winding, of a relay device for governing certain control connections for said machine, said device being dependent for energization upon both the load of, and rate of flux change in, certain of the machine circuits.

In testimony whereof I have hereunto subscribed my name this 30th day of July, 1917.

RUDOLF E. HELLMUND.